US010735941B2

(12) United States Patent
Son et al.

(10) Patent No.: US 10,735,941 B2
(45) Date of Patent: Aug. 4, 2020

(54) METHOD FOR TRANSFERRING SIGNALING MESSAGES OF TERMINAL BETWEEN NETWORK FUNCTIONS

(71) Applicant: Samsung Electronics Co., Ltd., Suwon-si, Gyeonggi-do (KR)

(72) Inventors: Jungje Son, Yongin-si (KR); Sunghoon Kim, Seoul (KR); Youngkyo Baek, Seoul (KR); Hoyeon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/722,410

(22) Filed: Oct. 2, 2017

(65) Prior Publication Data
US 2018/0103368 A1   Apr. 12, 2018

(30) Foreign Application Priority Data
Oct. 7, 2016  (KR) .......................... 10-2016-0129687

(51) Int. Cl.
| | | |
|---|---|---|
| *H04W 36/00* | (2009.01) | |
| *H04W 8/08* | (2009.01) | |
| *H04W 8/26* | (2009.01) | |
| *H04W 36/12* | (2009.01) | |

(52) U.S. Cl.
CPC .............. *H04W 8/08* (2013.01); *H04W 8/26* (2013.01); *H04W 36/0011* (2013.01); *H04W 36/0022* (2013.01); *H04W 36/12* (2013.01)

(58) Field of Classification Search
CPC ............... H04W 8/08; H04W 36/0011; H04W 36/0022; H04W 8/26; H04W 36/12

USPC ......................................................... 455/436
See application file for complete search history.

(56) References Cited

U.S. PATENT DOCUMENTS

| | | | |
|---|---|---|---|
| 2009/0303971 A1 | 12/2009 | Kim et al. | |
| 2010/0120455 A1* | 5/2010 | Aghili ..................... | H04L 51/38 455/466 |
| 2011/0235505 A1 | 9/2011 | Eswara et al. | |
| 2014/0094210 A1 | 4/2014 | Gellens et al. | |
| 2015/0382331 A1 | 12/2015 | Sun | |
| 2017/0070892 A1* | 3/2017 | Song ..................... | H04L 41/042 |
| 2017/0251370 A1 | 8/2017 | Liljenstam et al. | |

(Continued)

FOREIGN PATENT DOCUMENTS

WO   2015/126293 A1   8/2015

OTHER PUBLICATIONS

3GPP TR 23.799 V0.6.0 (Jul. 2016); 3rd Generation Partnership Project; Technical Specification Group Services and System Aspects; Study on Architecture for Next Generation System (Release 14).*

(Continued)

*Primary Examiner* — Khoi H Tran
*Assistant Examiner* — B M M Hannan
(74) *Attorney, Agent, or Firm* — Jefferson IP Law, LLP

(57) ABSTRACT

A communication method of a mobility management (MM) function is provided. The communication method includes receiving, from a terminal, a signaling message including first information for determining a session management (SM) function to transmit the signaling message, determining an SM function based on the first information, and transmitting the signaling message to the determined SM function.

13 Claims, 8 Drawing Sheets

(56) References Cited

U.S. PATENT DOCUMENTS

2017/0289046 A1* 10/2017 Faccin ................... H04L 47/20
2017/0318450 A1* 11/2017 Salkintzis ............. H04W 12/06
2017/0339609 A1* 11/2017 Youn ..................... H04W 76/11
2018/0359675 A1* 12/2018 Chandramouli ...... H04W 28/20

OTHER PUBLICATIONS

Nokia et al., "Update to the interaction between MM and SM", 3GPP Draft: S2-165411 Was S2-165283, 5G-MIM-SM V4 3rd Generation Partnership Project (3GPP), Mobile Competence Centre, 650, Route Des Lucioles, F-06921 Sophia-Antipolis Cedex , France, vol. SA WG2, No. Sanya, China, Aug. 29, 2016-Sep. 2, 2016, Sep. 3, 2016, XP051169389, Retrieved from the Internet: URL:http://www.3gpp.orglftp/tsg_sa/WG2_Arch/TSGS2_116BIS_Sanya/Oocs/.

NEC, "Session management per POU session", 3GPP Draft: S2-165250, 3rd Generation Partnership Project (3GPP), Mobile Competence Centre, 650, Route Des Lucioles ; F-06921 Sophia-Antipolis Cedex, France, vol. SA WG2, No. China, Sanya, Aug. 29, 2016-Sep. 3, 2016, Sep. 3, 2016, XP051169280, Retrieved from the Internet: URL:http://www.3gpp.orglftp/tsg_sa/WG2_Arch/TSGS2_116BIS_Sanya/Docs/.

Huawei et al., "Solution: The discovery of NFs", 3GPP Draft: S2-161019, Solution for the Discovery of NFS V1.0., 3rd Generation Partnership Project (3GPP), Mobile Competence Centre, 650, Route Des Lucioles, F-06921 Sophia-Antipolis Cedex ; France, vol. SA WG2, No. Sophia Antipolis, France, Feb. 23, 2016-Feb. 26, 2016, Feb. 22, 2016, XP051 078008, Retrieved from the Internet: URL:http://www.3gpp.orglftp/Meetings_3GPP_SYNC/SA 2/Docs/.

Samsung et al.,"Update on solution 4.16: the interaction between MM and SM", 3GPP Draft, S2-165733, Update SM MM, Interaction Solution 4.16 , 3rd Generation Partnership Project (3GPP), Mobile Competence Centre; 650, Route Des Lucioles ; F-06921 Sophia-Antipolis Cedex; France, vol. SA WG2, No. Kaohsiung City, Taiwan; Oct. 19, 2016-Oct. 23, 2016, Oct. 16, 2016, XP051155318, Retrieved from the Internet:URL:http://www.3gpp.org/ftp/Meetings_3GPP_SYNC/SA 2/Docs/.

European Search Report dated May 15, 2019, issued in European Patent Application No. 17858701.0.

* cited by examiner

METHOD FOR TRANSFERRING SIGNALING MESSAGES OF TERMINAL BETWEEN NETWORK FUNCTIONS

CROSS-REFERENCE TO RELATED APPLICATION(S)

This application claims the benefit under 35 U.S.C. § 119(a) of a Korean patent application filed on Oct. 7, 2016 in the Korean Intellectual Property Office and assigned Serial number 10-2016-0129687, the entire disclosure of which is hereby incorporated by reference.

TECHNICAL FIELD

The present disclosure relates to a method for transferring signaling messages of terminal between several network functions performing a control function of the terminal in a mobile communication system.

BACKGROUND

To meet a demand for radio data traffic that is on an increasing trend since commercialization of a $4^{th}$ generation (4G) communication system, efforts to develop an improved $5^{th}$ generation (5G) communication system or a pre-5G communication system have been conducted. For this reason, the 5G communication system or the pre-5G communication system is called a beyond 4G network communication system or a post long-term evolution (LTE) system. To achieve a high data transmission rate, the 5G communication system is considered to be implemented in a very high frequency (mm Wave) band (e.g., like 60 GHz band). To relieve a path loss of a radio wave and increase a transfer distance of the radio wave in the very high frequency band, in the 5G communication system, beamforming, massive multiple input, multiple output (MIMO), full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (RAN), an ultra-dense network, a device to device (D2D) communication, a wireless backhaul, a moving network, cooperative communication, coordinated multi-points (CoMP), and reception interference cancellation have been developed. In addition to this, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the internet of things (IoT) network that transmits/receives information between distributed components such as things and processes the information. The internet of everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the M2M, and the MTC, have been implemented by techniques such as the beamforming, the MIMO, and the array antenna. The application of the cloud RAN as the big data processing technology described above may also be considered as an example of the fusing of the 5G communication technology with the IoT technology.

On the other hand, there may be logical devices performing several network functions for controlling the terminal in a mobile communication system. In such a situation, there is a need to support an operation of network devices to efficiently operate network resources.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for transferring signaling messages transmitted from a terminal between several logical devices supporting network functions in a mobile communication system, in a situation in which there are the logical devices that are responsible for the network functions performing a control function of the terminal.

In accordance with an aspect of the present disclosure, a communication method of a mobility management (MM) function is provided. The communication method includes receiving, from a terminal, a signaling message including first information for determining a session management (SM) function to transmit the signaling message, determining an SM function based on the first information, and transmitting the signaling message to the determined SM function.

In an embodiment, the first information comprises at least one of a data network name (DNN) or network slice selection assistance information (NSSAI).

In an embodiment, the determining of the SM function includes transmitting, to a network repository function, a request message for requesting second information of the SM function corresponding to the first information, receiving, from the network repository function, the second information, and determining the SM function based on the first information and the second information.

In an embodiment, the signaling message further includes a header and a payload.

In an embodiment, the signaling message includes a packet data network (PDN) connection establishment message.

In accordance with another aspect of the present disclosure, a mobility management (MM) function is provided. The MM function includes a transceiver configured to transmit and receive a signal, and a controller configured to receive, from a terminal, a signaling message including first information for determining a session management (SM) function to transmit the signaling message, determine an SM function based on the first information, and transmit the signaling message to the determined SM function.

In accordance with another aspect of the present disclosure, a communication method of a terminal is provided. The communication method includes generating a signaling message including first information for determining a session management (SM) function to transmit the signaling message, and transmitting, to a mobility management (MM) function, the signaling message including the first information.

In accordance with another aspect of the present disclosure, a terminal is provided. The terminal includes a transceiver configured to transmit and receive a signal, and a controller configured to generate a signaling message including first information for determining a session management (SM) function to transmit the signaling message, and transmit, to a mobility management (MM) function, the signaling message including the first information.

According to an embodiment of the present disclosure, a method for transferring signaling messages of a terminal between devices performing a network function configured by a mobile communication service provider in a mobile communication service provider network can be provided to support the operation of the network devices in various environments, thereby efficiently operating the network resources.

Other aspects, advantages, and salient features of the disclosure will become apparent to those skilled in the art from the following detailed description, which, taken in conjunction with the annexed drawings, disclosure various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
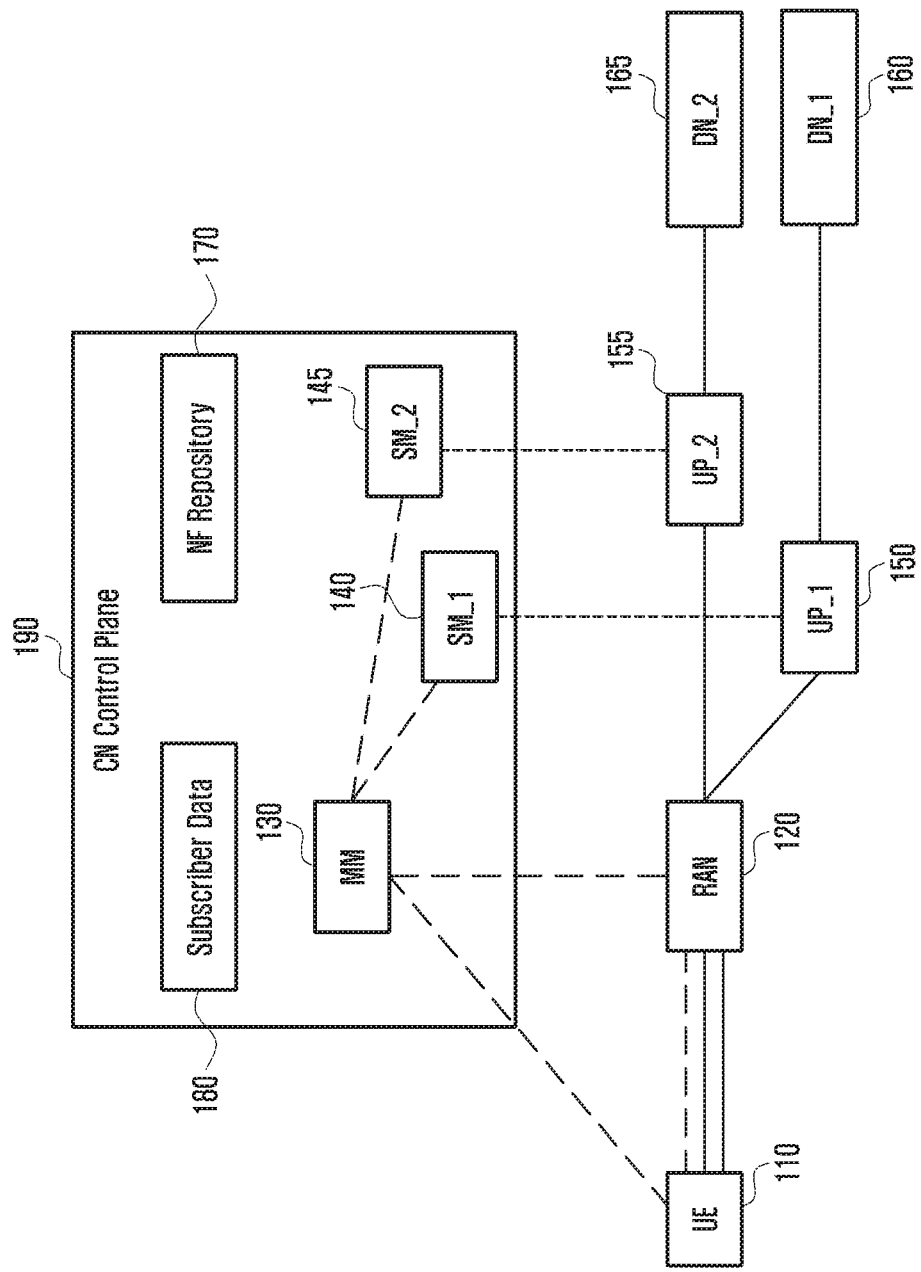
FIG. 1 is a diagram illustrating an example of a network structure of a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and consideration may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various advantages and features of the present disclosure and methods accomplishing the same will become apparent from the following detailed description of various embodiments with reference to the accompanying drawings. However, the present disclosure is not limited to various embodiments disclosed herein but will be implemented in various forms. Various embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long-term evolution (3GPP LTE). However, the present disclosure is not limited to the terms and names but may also be identically applied to the system according to other standards.

FIG. 1 is a diagram illustrating an example of a network structure of a mobile communication system according to an embodiment of the present disclosure.

Referring to FIG. 1, the mobile communication system includes a terminal 110, a base station 120, a control functions 190 that includes a mobility management (MM) function 130, session management (SM) functions 140 and 145, subscriber data 180, and a network function (NF) repository 170, and user plane (UP) functions 150 and 155. A set of devices that include the control functions 190 (130, 140, 145, 170, and 180) and the UP functions 150 and 155, excluding the terminal 110 and the base station 120 in the mobile communication system is referred to as a core network (CN). The mobile communication system receives service data related to external services through data networks (DNs) 160 and 165 for interworking with external applications.

The base station 120 provides a wireless connection to the terminal 110. That is, the base station 120 schedules and allocates radio resources to serve traffic of users, thereby supporting the connection between the terminal 110 and the CN.

The MM function 130 performs a MM function of the terminal 110 and is connected to the base station 120 to transfer a control signal associated to MM to the terminal 110.

The SM functions 140 and 145 manage a session in which the terminal 110 may perform a service through a data NW and communicate with the UP functions 150 and 155 to manage a transmission of the service data for the terminal 110.

The UP functions 150 and 155 process a packet arriving from the base station 120 or a packet to be transmitted to the base station 120.

A connection established to allow the control functions 190 to transmit/receive a control signal to/from the terminal 110 is referred to as an NG1 connection.

A connection established to allow the control functions 190 to transmit/receive a control signal to/from the base station 120 is referred to as an NG2 connection. The packets transmitted/received between the terminal 110 and the control functions 190 through the NG1 connection are transferred between the terminal 110 and the base station 120 through the wireless connection and transferred between the base station 120 and the control functions 190.

In order for the UP functions 150 and 155 to transmit/receive packets to/from the terminal 110, a connection established to allow the UP functions 150 and 155 to transmit/receive packets to/from the base station 120 is referred to as an NG3 connection.

In the mobile communication system, the terminal 110 may transmit/receive data to/and from the plurality of DNs 160 and 165 and the plurality of the UP functions 150 and 155 so that the terminal 110 can serve various types of external services. At this time, the DN 160 and the DN 165 may each transmit/receive data through the terminal 110 through the UP function 150 and the UP function 155, respectively.

At this time, the control of the UP function 150 for connection between the UP function 150 and the terminal 110 and the base station 120 may be performed through the SM function 140. Further, the control of the UP function 155 for connection between the UP function 155 and the terminal 110 and the base station 120 may be performed through another SM function 145. At this time, the connection for transmitting/receiving a control signal between the terminal 110 and the SM function 140 and the SM function 145 is established through the NG1 connection between the MM function 130 and the terminal 110. Further, the connection for transmitting/receiving a control signal between the base station 120 and the SM function 140 and the SM function 145 is established through the NG2 connection between the MM function 130 and the terminal 110.

At this time, the MM function 130 does not process a signaling message for establishing a packet data unit (PDU) connection with the SM functions 140 and 145 received from the terminal 110 but transfers the signaling message to the SM function 140 or the SM function 145. At this time, the MM function 130 allows the SM function 140 or the SM function 145 to select an appropriate SM function of processing the PDU connection establishment received from the terminal 110 to thereby transfer the PDU connection establishment message.

Figure 2:
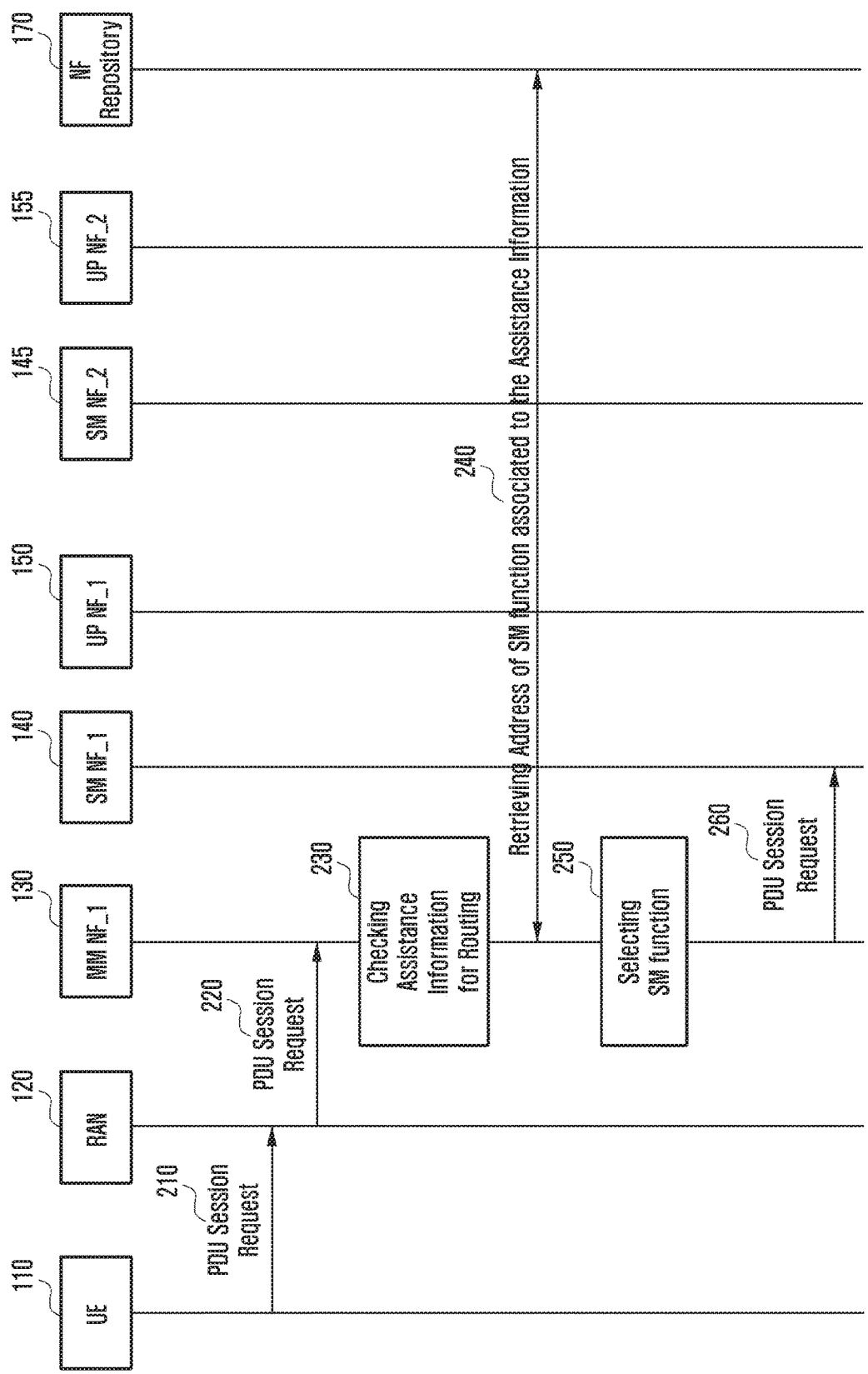
FIG. 2 is a diagram illustrating a procedure for transferring a packet data unit (PDU) connection establishment request message of a terminal between an MM network function and an SM network function in a mobile communication system according to an embodiment of the present disclosure.

FIG. 2 is an exemplified diagram of a procedure for transferring a PDU connection establishment request message of a terminal according to an embodiment of the present disclosure between an MM function and an SM function in a mobile communication system according to an embodiment of the present disclosure.

Referring to FIG. 2, the terminal 110 transmits a PDU connection establishment message to the MM function (MM NF_1) 130 through the base station 120, at operations 210 and 220. When configuring the PDU connection establishment message, the terminal 110 includes assistance information for routing in the PDU connection establishment message so that the MM function 130 may allow the SM function (SM NF_1) 140 or the SM function (SM NF_2) 145 to select the SM function of transferring the PDU connection establishment message. At this time, the assistance information for routing may include a name of a DNN to which the terminal 110 is connected or characteristics (for example, an IP based PDU connection, a non-IP based PDU connection, a PDU connection for internet of things (IoT), a PDU connection for a broadband service) of a PDU connection, network slice information (a network slice type or a network slice ID) requested when the terminal 110 supports a network slice, a PDU session ID when an already established PDU connection is modified, or the like.

If the MM function 130 receives the PDU connection establishment message from the terminal 110, the MM function 130 confirms the assistance information for routing to select the SM functions 140 and 145 in the PDU connection establishment message, at operation 230.

The MM function 130 selects the SM function of transferring the PDU connection establishment message received from the terminal 110 based on the information confirmed from the assistance Information for routing. If the configuration information of the SM function and the data network are transmitted to the MM function 130 in advance, the MM function 130 may select the SM function among the stored SM functions. If the MM function 130 needs information on additional SM functions, the MM function 130 may request the information on the SM function matching the information included in the assistance information for routing to the NF repository 170, at operation 240.

When the MM function 130 selects the SM function, the MM function 130 selects SM functions corresponding to the information stored in the assistance information for routing, at operation 250. For example, if the requested DNN is included in the assistance information for routing, the SM function controlling the UP function that is linked to the requested DNN to provide the service is selected or if the requested slice type is included in the assistance information for routing, the SM function of supporting the corresponding slice type is selected. At this time, if the plurality of SM functions are selectable, the MM function 130 may select the SM function in consideration of the location of the terminal 110 and the like.

The MM function 130 transfers the PDU connection establishment message to the selected SM function, at operation 260.

Figure 3:
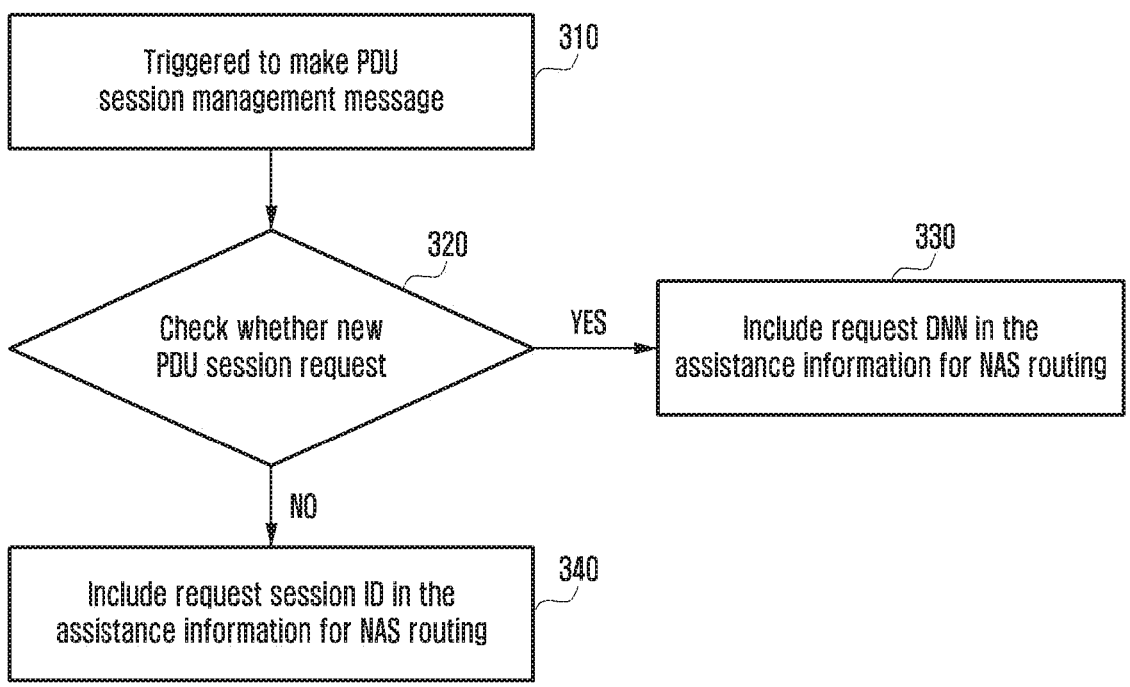
FIG. 3 is an exemplified diagram of a procedure of generating a PDU connection establishment request message of a terminal according to an embodiment of the present disclosure.

FIG. 3 is an exemplified diagram of a procedure of generating the PDU connection establishment request message of the terminal according to an embodiment of the present disclosure.

Referring to FIG. 3, the terminal 110 configures the PDU connection establishment message when new PDU connection establishment is required due to activation of application software within the terminal, a specific service connection, a service termination, or the like, or when the PDU connection establishment already connected needs to be changed, at operation 310.

The terminal 110 confirms if a PDU connection establishment message to be created is a new PDU connection request message, at operation 320.

If the PDU connection establishment message is the new PDU connection request message (YES at operation 320, the terminal 110 includes the name of the data network (requested DNN) requesting access to be connected through the new PDU connection in the assistance information for network-attached storage (NAS) routing of the PDU connection establishment message, at operation 330.

If the PDU connection establishment message is the existing PDU connection change request message (NO at operation 320), the terminal 110 includes an indicator (e.g., a session ID) informing the existing PDU connection in the assistance information for NAS routing of the PDU connection establishment message, at operation 340.

Figure 4:
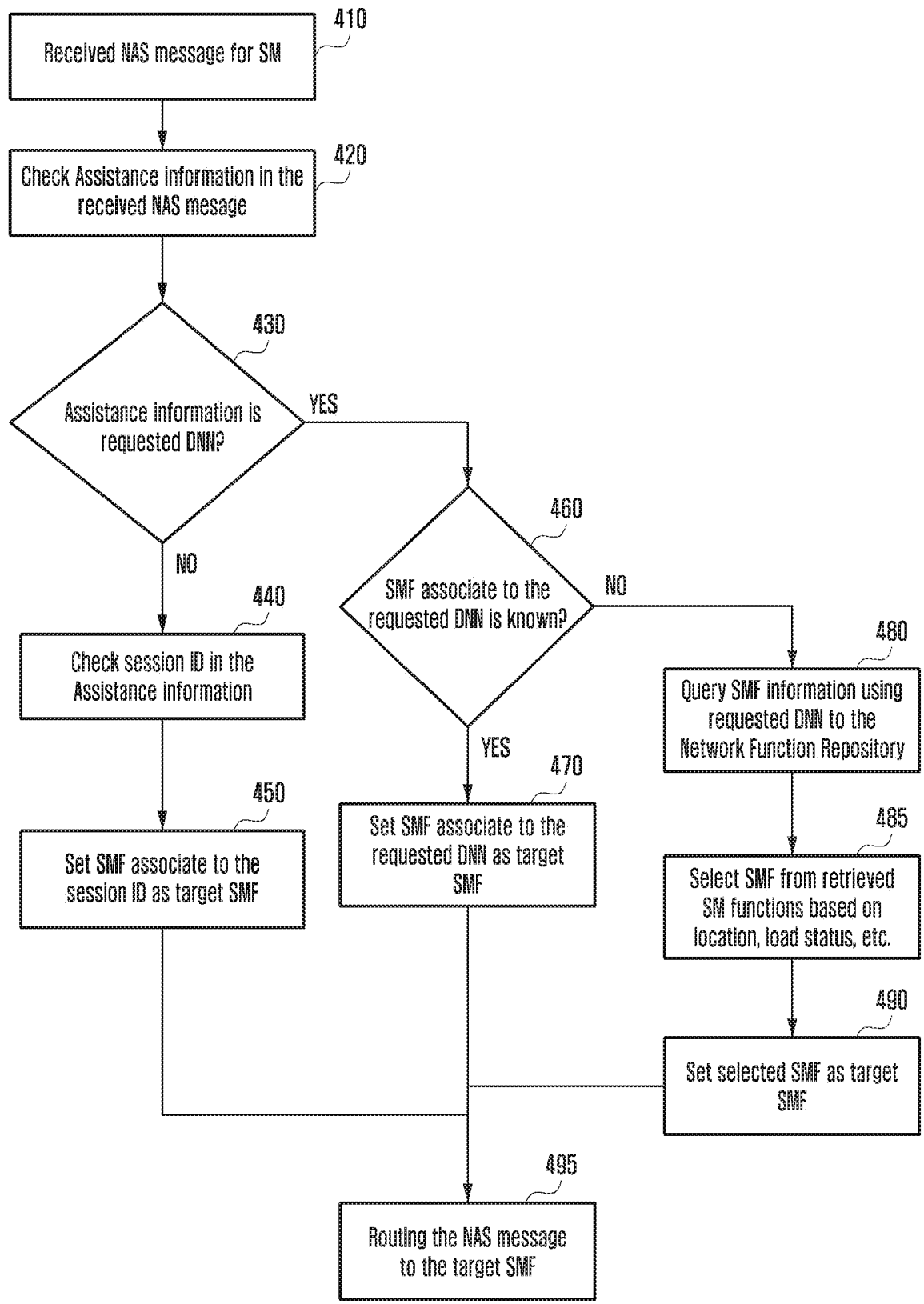
FIG. 4 is an exemplified diagram of a procedure of processing a PDU connection establishment request message of a terminal of an MM network function according to an embodiment of the present disclosure.

FIG. 4 is an exemplified diagram of a procedure of processing the PDU connection establishment request message of the terminal of the MM network function according to an embodiment of the present disclosure.

Referring to FIG. 4, if the MM function 130 receives a signaling message from the terminal 110, the MM function 130 confirms whether it is the signaling message to be transmitted to the SM function such as the PDU connection establishment message, at operation 410.

If the received signaling message is the signaling message to be transferred to the SM function, the MM function 130 confirms the assistance information in the received signaling message, at operation 420.

The MM function 130 determines whether the information included in the assistance information includes the information on the requested DNN, at operation 430.

If the information included in the assistance information is not the requested DNN information (NO at operation 430), the MM function 130 confirms whether the information included in the assistance information includes the information (e.g., session ID) or the like informing the existing PDU connection, at operation 440.

If the information included in the assistance information is the information informing the existing PDU connection, the MM function 130 sets the SM function managing the corresponding PDU connection as a target SM function, at operation 450.

If the assistance information includes the information on the requested DNN (YES at operation 430), the MM function 130 confirms whether to know the information on the SM functions corresponding to the requested DNN, at operation 460.

If there is no information on the SM functions corresponding to the requested DNN (NO at operation 460), the MM function 130 requests the information on the SM function corresponding to the requested DNN to the NF repository 170, at operation 480.

If the MM function 130 knows the information on the SM functions corresponding to the requested DNN (YES at operation 460), the MM function 130 confirms the location of the terminal 110 that transmits the PDU connection establishment message, a load state of the SM functions and the UP functions managed by the SM functions, or the like among the SM functions corresponding to the requested DNN to select the optimal SM function as the target SM function, at operation 470.

If the MM function 130 receives the information of the SM function corresponding to the requested DNN from the NF repository 170, the MM function 130 confirms the location of the terminal 110 transmitting the PDU connection establishment message, a load state of the SM functions and the UP functions managed by the SM functions, or the like among the SM functions to select the optimal SM function as the target SM function, at operations 485 and 490.

When the target SM function is determined, the MM function 130 transfers the signaling message received by the terminal 110 to the target SM function, at operation 495.

Figure 5:
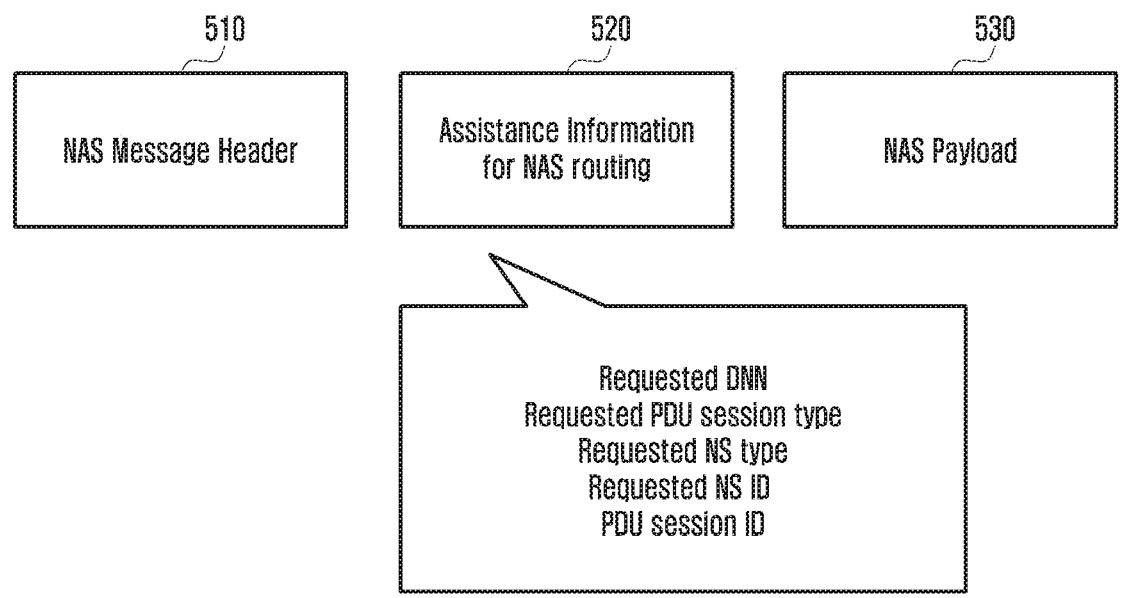
FIG. 5 is an exemplified diagram of a configuration of signaling messages of a terminal according to an embodiment of the present disclosure.

FIG. 5 is an exemplified diagram of a configuration of signaling messages of a terminal according to an embodiment of the present disclosure.

Referring to FIG. 5, the signaling message of the terminal according to an embodiment of the present disclosure includes an NAS message header 510, assistance information for NAS routing 520, a NAS payload 530, and the like.

The NAS message header 510 includes information that may allow the terminal 110 to transfer signaling messages requested to the MM function 130 and distinguish the signaling messages to be transferred.

The assistance information for NAS routing 520 includes information required to select a corresponding network function when the MM function 130 transfers the received signaling message to another network function. At this time, the assistance information for routing may include a name of a DNN to which the terminal 110 is connected or characteristics (for example, an internet protocol (IP) based PDU connection, a non-IP based PDU connection, a PDU connection for IoT, a PDU connection for a broadband service) of a PDU connection, network slice information (a network slice type or a network slice ID) requested when the terminal 110 supports a network slice, or information (for example, PDU session ID or the like) instructing the corresponding connection when the connection with another network function is already established.

The MM function 130 may select the network function of processing the signaling messages from the information received by the NAS message header 510 and the assistance information for NAS routing 520.

The NAS payload 530 includes specific information required to configure an action requested by the terminal 110 through the signaling message.

Figure 6:
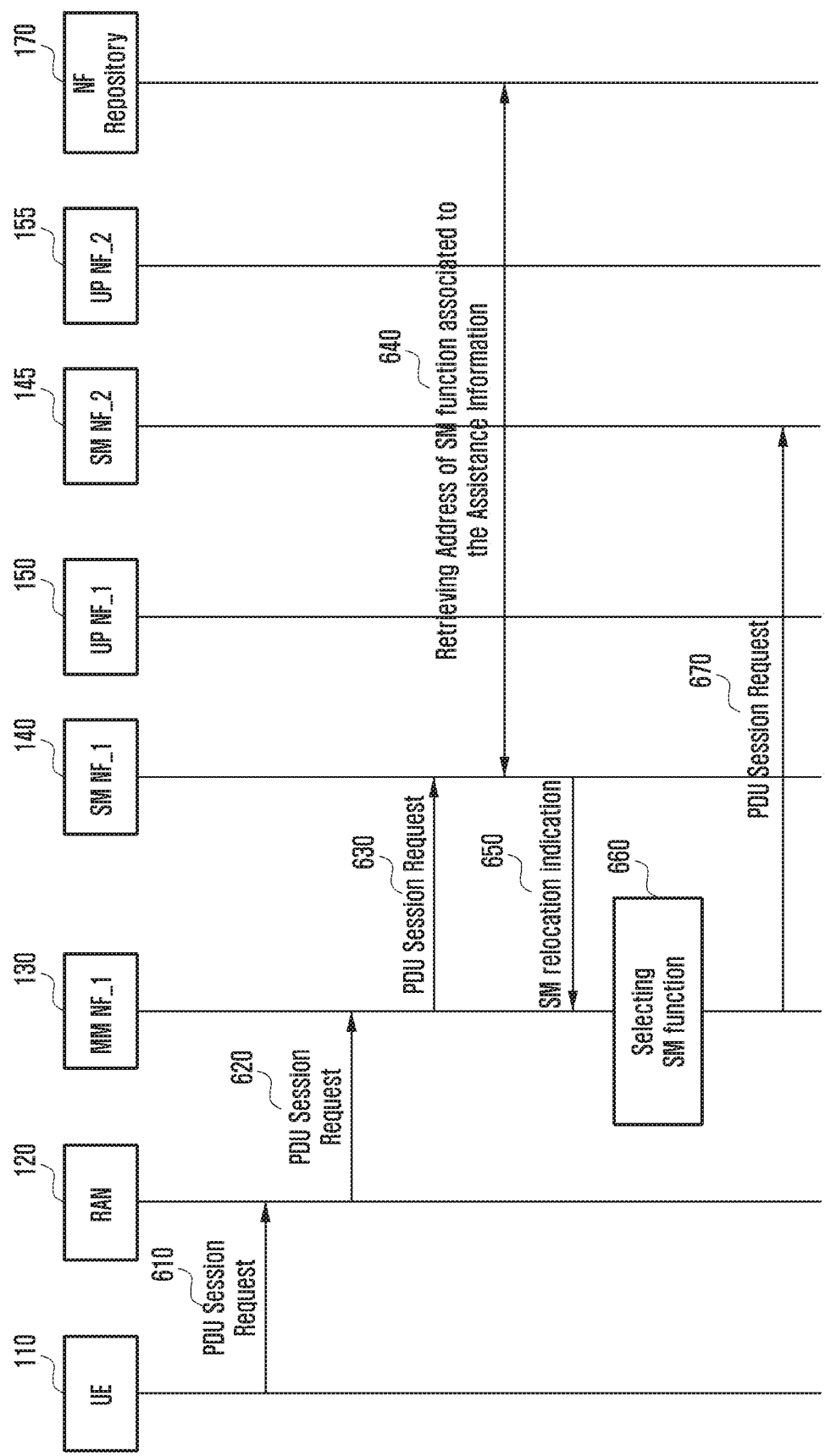
FIG. 6 is an exemplified diagram of a procedure for transferring a PDU connection establishment request message of a terminal according to an embodiment of the present disclosure between an MM function and an SM function in a mobile communication system.

FIG. 6 is an exemplified diagram of a procedure for transferring a PDU connection establishment request message of a terminal between an MM function and an SM function in a mobile communication system according to an embodiment of the present disclosure.

Referring to FIG. 6, the terminal 110 transmits a PDU connection establishment message to an MM function (MM NF_1) 130 through the base station 120, at operations 610 and 620.

If the MM NF_1 130 receives the PDU connection establishment message from the terminal 110, the MM NF_1 130 selects the SM function 140 for serving the terminal 110. At this time, the SM function 140 may be selected by referring to the location of the terminal 110 or the like.

When the SM function 140 (SM NF_1) receives the PDU connection establishment message, at operation 630, the SM function 140 decrypts the PDU connection establishment message to support the PDU connection requested from the PDU connection establishment message, and transfers a response of the PDU connection establishment message to the terminal 110 through the MM NF_1 130.

If the SM function 140 does not support the PDU connection requested in the PDU connection establishment message, the SM function 140 communicates with the NF repository 170 to obtain the information on the SM function serving the requested DNN or the like which is requested in the PDU connection establishment message information, at operation 640.

The SM function 140 includes the SM function information that may not process the PDU connection establishment message and may process the PDU connection establishment message obtained by the connection with the NF repository 170 or another method and returns it to the MN NF_1 130, at operation 650.

When the MM NF_1 130 receives the information on other SM functions to process the PDU connection establishment from the SM function 140, the MM NF_1 130 again selects to the SM function of processing the PDU connection establishment based on the location of the terminal 110, at operation 660.

The MM NF_1 130 transfers the PDU connection establishment message to the selected SM function 145, at operation 670.

According to an embodiment of the present disclosure, when the MM function (MM NF_1) 130 receives the PDU connection establishment message from the terminal 110, the MM function may receive the information on the SM functions that may process the PDU connection establishment message through the connection with the NF repository 170, select the SM function of processing the PDU connection establishment message received from the terminal 110 based on the received information, and transfer the PDU connection establishment message to the selected SM function 145, at operation 670.

Figure 7:
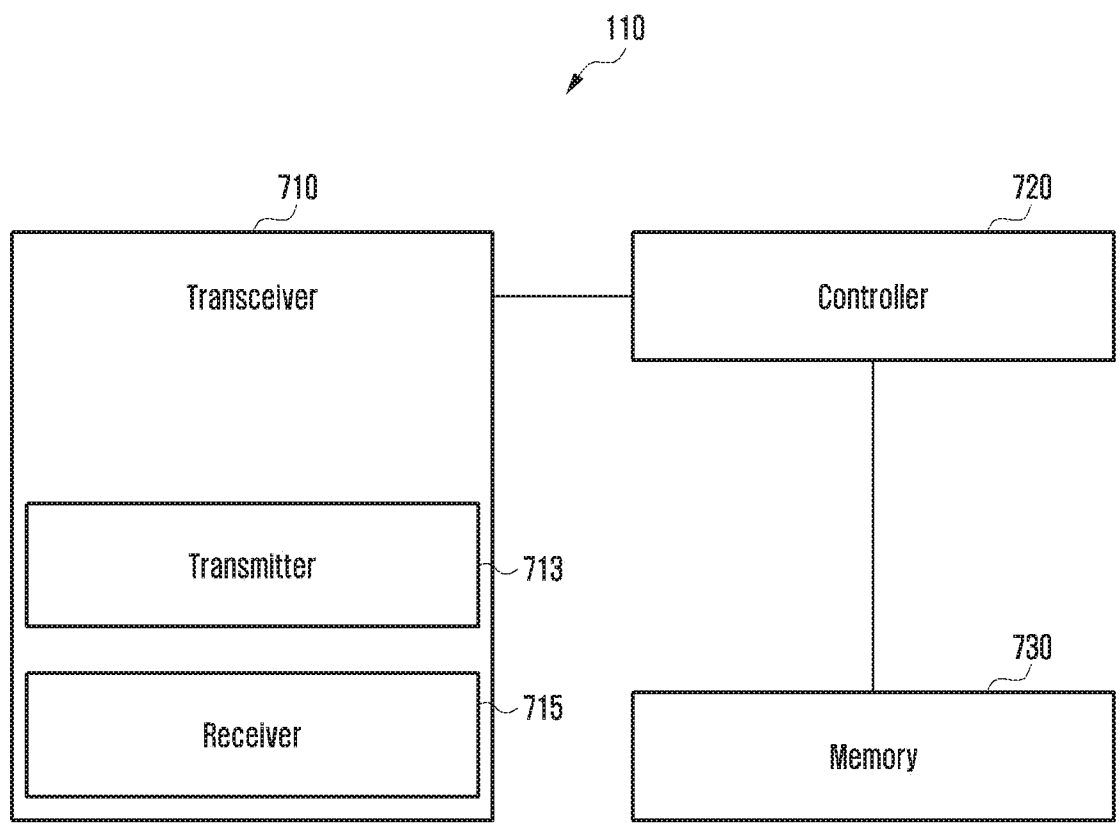
FIG. 7 is a diagram illustrating a configuration of a terminal according to an embodiment of the present disclosure.

FIG. 7 is a diagram for explaining a configuration of the terminal according to an embodiment of the present disclosure.

Referring to FIG. 7, the terminal 110 according to one embodiment of the present disclosure may include a transceiver 710 and a controller 720 controlling the overall operation of the terminal 110. Further, the transceiver 710 may include a transmitter 713 and a receiver 715.

The transceiver 710 may transmit and receive signals to and from other network entities.

The controller 720 may control the terminal 110 to perform any one operation of the above-described various embodiments.

Meanwhile, the controller 720 and the transceiver 710 are not necessarily implemented as a separate module but may be implemented as one component in a form like a single chip. Further, the controller 720 and the transceiver 710 may be electrically connected to each other. Further, for example, the controller 720 may be a circuit, an application-specific circuit, or at least one processor. In addition, the operations of the terminal 110 may be realized by including a memory device storing the corresponding program code in any component of the terminal.

Further, the terminal 110 according to an embodiment of the present disclosure may further include a memory 730. The memory 730 may store at least one of the information transmitted/received through the transceiver 710 and the information generated through a base station controller.

Figure 8:
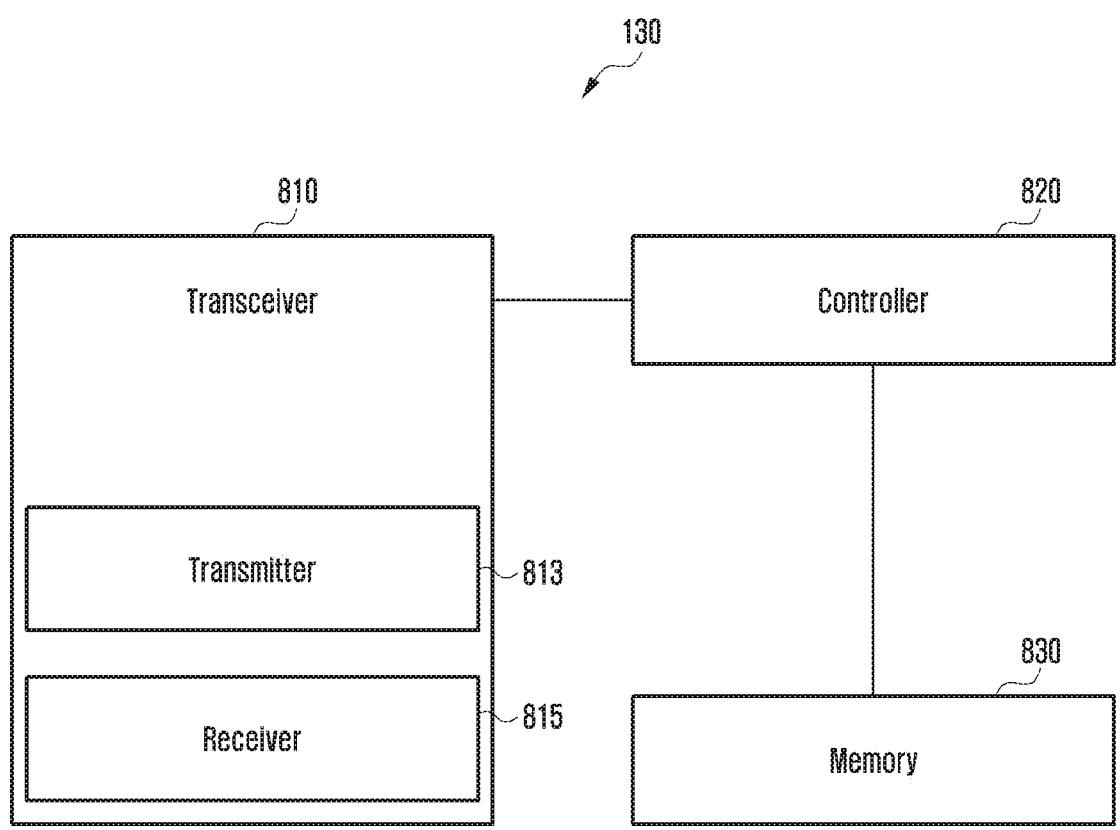
FIG. 8 is a diagram illustrating a configuration of an MM network function according to an embodiment of the present disclosure.

FIG. 8 is a diagram illustrating a configuration of an MM function (e.g., MM network function) according to an embodiment of the present disclosure.

Referring to FIG. 8, the MM function 130 according to one embodiment of the present disclosure may include a transceiver 810 and a controller 820 controlling the overall operation of the MM function 130. Further, the transceiver 810 may include a transmitter 813 and a receiver 815.

The transceiver 810 may transmit and receive signals to and from other network entities.

The controller 820 may control the MM function 130 to perform an operation of any one of the above-described various embodiments.

Meanwhile, the controller 820 and the transceiver 810 are not necessarily implemented as a separate module but may be implemented as one component in a form like a single chip. Further, the controller 820 and the transceiver 810 may be electrically connected to each other. Further, for example, the controller 820 may be a circuit, an application-specific circuit, or at least one processor. In addition, the operations of the MM function 130 may be realized by including a memory device storing the corresponding program code in any component of the MM function 130.

Further, the MM function 130 according to an embodiment of the present disclosure may further include a memory 830. The memory 830 may store at least one of the information transmitted/received through the transceiver 810 and the information generated through a base station controller. For example, the memory 730 may store the information on the SM functions received from the NF repository 170, or the like.

In the detailed various embodiments of the present disclosure, components included in the present disclosure are represented by a singular number or a plural number according to the detailed an embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a mobility management (MM) entity executing a mobility management function in a wireless communication system, the method comprising:
 receiving, from a terminal, a signaling message to establish a protocol data unit (PDU) session, the signaling message including first information for selecting a session management (SM) entity executing a session management function to transmit the signaling message;

in case that information on the SM entity corresponding to the first information is locally configured on the MM entity, selecting the SM entity based on the first information; and in case that the information on the SM entity corresponding to the first information is not locally configured on the MM entity, transmitting, to a network repository entity executing a network repository function, a request message for requesting second information for identifying a set of SM entity corresponding to the first information, receiving, from the network repository entity, the second information, and selecting the SM entity based on the second information; and transmitting the signaling message to the selected SM entity.

2. The method of claim 1, wherein the first information comprises at least one of a data network name (DNN), network slice selection assistance information (NSSAI), or PDU session identifier.

3. The method of claim 1, wherein the signaling message further includes a header and a payload.

4. The method of claim 1, wherein the signaling message comprises a PDU session establishment message.

5. A mobility management (MM) entity executing a mobility management function in a wireless communication system, the MM entity comprising:
 a transceiver; and
 a controller configured to:
  receive, from a terminal via the transceiver, a signaling message to establish a protocol data unit (PDU) session, the signaling message including first information for selecting a session management (SM) entity executing a session management function to transmit the signaling message,
  in case that information on the SM entity corresponding to the first information is locally configured on the MM entity, select the SM entity based on the first information, and
  in case that the information on the SM entity corresponding to the first information is not locally configured on the MM entity, transmit, to a network repository entity executing a network repository function via the transceiver, a request message for requesting second information for identifying a set of SM entities corresponding to the first information, receive, from the network repository entity via the transceiver, the second information, and select the SM entity based on the second information,
  transmit, via the transceiver, the signaling message to the selected SM entity.

6. The MM entity of claim 5, wherein the first information comprises at least one of a data network name (DNN), network slice selection assistance information (NSSAI), or PDU session identifier.

7. The MM entity of claim 5, wherein the signaling message comprises a PDU session establishment message.

8. A method of performed by a terminal in a wireless communication system, the method comprising:

generating a signaling message to establish a protocol data unit (PDU) session, the signaling message including first information for selecting a session management (SM) entity executing a session management function to transmit the signaling message; and transmitting, to a mobility management (MM) entity executing a mobility management function, the signaling message including the first information, wherein the transmitting of the signaling message triggers the MM entity to, in case that information on the SM entity corresponding to the first information is locally configured on the MM entity, select the SM entity based on the first information, and, in case that information on the SM entity corresponding to the first information is not locally configured on the MM entity, transmit, to a network repository entity executing a network repository function, a request message for requesting second information for identifying a set of SM entities corresponding to the first information, receive, from the network repository entity, the second information and select the SM entity based on the second information.

9. The method of claim 8, wherein the first information comprises at least one of a data network name (DNN), network slice selection assistance information (NSSAI), or PDU session identifier.

10. The method of claim 8, wherein the signaling message comprises a PDU session establishment message.

11. A terminal in a wireless communication system, the terminal comprising:
 a transceiver; and
 a controller configured to:
  generate a signaling message to establish a protocol data unit (PDU) session, the signaling message including first information for selecting a session management (SM) entity executing a session management function to transmit the signaling message, and
  transmit, to a mobility management (MM) entity executing a mobility management function via the transceiver, the signaling message including the first information,
 wherein the transmitting of the signaling message triggers the MM entity to, in case that information on the SM entity corresponding to the first information is locally configured on the MM entity, select the SM entity based on the first information, and, in case that information on the SM entity corresponding to the first information is not locally configured on the MM entity, transmit, to a network repository entity executing a network repository function, a request message for requesting second information for identifying a set of SM entities corresponding to the first information, receive, from the network repository entity, the second information, and select the SM entity based on the first information and the second information.

12. The terminal of claim 11, wherein the first information comprises at least one of a data network name (DNN), network slice selection assistance information (NSSAI), or PDU session identifier.

13. The terminal of claim 11, wherein the signaling message comprises a PDU session establishment message.

* * * * *